(12) United States Patent
Rounds et al.

(10) Patent No.: US 6,805,897 B2
(45) Date of Patent: Oct. 19, 2004

(54) FEED SUPPLEMENT FOR LIVESTOCK

(76) Inventors: Kent D. Rounds, 255 W. Florence, Glenwood, IA (US) 51534; Marvin J. Schreck, 12359 Franklin St., Omaha, NE (US) 68154

( * ) Notice: Subject to any disclaimer, the term of this patent is extended or adjusted under 35 U.S.C. 154(b) by 0 days.

(21) Appl. No.: 10/375,945

(22) Filed: Feb. 28, 2003

(65) Prior Publication Data

US 2003/0165610 A1 Sep. 4, 2003

Related U.S. Application Data

(63) Continuation of application No. 09/844,720, filed on Apr. 28, 2001, now abandoned.
(60) Provisional application No. 60/221,710, filed on Jul. 31, 2000.

(51) Int. Cl.[7] .................................................. A23K 1/14
(52) U.S. Cl. ....................... 426/623; 426/624; 426/630; 426/635; 426/636; 426/807
(58) Field of Search ................................. 426/623, 624, 426/630, 635, 636, 807

(56) References Cited

U.S. PATENT DOCUMENTS

| | | | | |
|---|---|---|---|---|
| 3,881,024 A | * | 4/1975 | Pahoundis et al. .......... | 426/578 |
| 3,928,640 A | * | 12/1975 | Stahler ....................... | 426/465 |
| 3,955,536 A | * | 5/1976 | Bunger ....................... | 119/451 |
| 4,037,002 A | * | 7/1977 | Brumagim .................. | 426/641 |
| 4,728,517 A | * | 3/1988 | Markham et al. ............. | 426/53 |
| 5,174,903 A | * | 12/1992 | Miller ........................ | 210/725 |
| 5,269,939 A | * | 12/1993 | Laurent et al. ............. | 210/705 |
| 5,508,058 A | * | 4/1996 | Endres et al. ............... | 426/635 |
| 6,197,081 B1 | * | 3/2001 | Schmidt .......................... | 71/1 |

* cited by examiner

*Primary Examiner*—C. Sayala
(74) *Attorney, Agent, or Firm*—Adam H. Jacobs

(57) ABSTRACT

A feed supplement for livestock includes, in a feed supplement combination, a quantity of waste product material selected from the group comprising dissolved air floatation product (DAF) and paunch manure and a quantity of an inert dry medium which will not chemically react with the waste product material such as soy hulls, hay, alfalfa, corn and other such dry mediums. The waste product material comprises between one percent (1%) and ninety-nine percent (99%) of the feed supplement combination. The feed supplement combination is then processed through an extrusion process involving the cooking, grinding and mixing of the feed supplement combination under pressure and elevated temperature, wherein the temperature of the feed supplement combination is raised above 250 degrees Fahrenheit to sterilize and dehydrate the feed supplement combination.

6 Claims, No Drawings

FEED SUPPLEMENT FOR LIVESTOCK

CROSS-REFERENCE TO RELATED PROVISIONAL PATENT.

This is a continuation of Ser. No. 09/844,720 filed Apr. 28, 2001; abandoned which claims priority based on a provisional patent, specifically on U.S. Provisional Patent Ser. No. 60/221,710 filed Jul. 31, 2000.

BACKGROUND OF THE INVENTION

1. Technical Field

The present invention relates to feed supplements and, more particularly, to a feed supplement for livestock which includes a quantity of paunch manure in a percentage by weight of one percent (1%) to one hundred percent (100%), pressing or squeezing the paunch manure in a press device to remove a large percentage of the moisture content of the paunch manure and then extruding the pressed paunch manure at a temperature of at least 250 degrees Fahrenheit thereby sterilizing the paunch manure and flashing off excess moisture, the extruded paunch manure being used alone or in combination with a dry medium such as soy hulls, hay or dissolved air floatation product, also known as "DAF", for increased "by-pass" protein and nutritional values.

2. Description of the Prior Art

Ideally, one would hope to find uses for various types of waste products produced by industry in order to recycle those waste products to gain beneficial use therefrom. One type of waste product for which little, if any, use has been found is dissolved air flotation product ("DAF") which is a product removed from waste water treatment plants. The DAF is formed at the top of the settling tank of the sewer treatment system and is composed generally of oil and grease separated from the sewer effluent. The DAF is then mechanically and/or chemically removed from the top surface of the sewer water being treated and thus becomes a liability as it is difficult to properly dispose of and can be environmentally hazardous. Commonly, the DAF is placed in a landfill or the like and left to decompose, which presents additional hazards should the DAF leak into the groundwater. There is therefore a need for a use to be found for DAF which will substantially lessen or eliminate the need for the DAF to be disposed of in a landfill or the like.

Another type of commonly produced waste material which results from a different industry, namely the livestock slaughtering process, is paunch manure. Paunch manure is the partially digested feed residing in the first stomach of the ruminant after slaughter. During the slaughtering process, the stomach is removed and the contents are emptied. Currently, as with DAF, there is no commercial use for the paunch manure, and the paunch manure must be disposed of by putting it in a landfill or by another such disposal method. Furthermore, the paunch manure, like DAF, must be disposed of in an environmentally safe and economically efficient manner, and such disposal methods are not always readily available. Therefore, as with DAF, there is a need for a use to be found for paunch manure which will substantially lessen or eliminate the need for the disposal of the paunch manure in a landfill or the like.

Of course, these are only two of the virtually innumerable types of waste products produced by various industries, but these two products have specific features which lend themselves toward additional uses. Specifically, both DAF and paunch manure include minerals and nutrients which can be digested and processed by ruminants provided that the ruminant will ingest the material in the first place. However, as both DAF and paunch manure are quite malodorous and generally repulsive to touch and eat, in order to encourage a ruminant to ingest the DAF or paunch manure, the material must be combined with other ingredients for use as a feed supplement. There is therefore a need for a combination of ingredients including DAF and/or paunch manure which will produce a high fat, high nutrition, high bypass feed supplement.

Numerous types of feed supplements and methods for producing the same are described in the prior art including such feed supplements as Pahoundis, Sr., et al., U.S. Pat. No. 3,881,024, Bunger, U.S. Pat. No. 3,955,536, and Stahler, U.S. Pat. No. 3,928,640. While each of these prior art feed supplements disclose feed supplements which are generally adequate for their intended purpose, there is still a need for feed supplement which is high in fat content, thus providing increased energy for livestock growth, and which is nutritionally superior to those feed supplements found in the prior art.

Therefore an object of the present invention is to provide an improved feed supplement for livestock.

Another object of the present invention is to provide an improved feed supplement for livestock which includes a percentage of DAF and/or paunch manure combined with a dry medium material in order to render the DAF and/or paunch manure edible for a ruminant.

Another object of the present invention is to provide an improved feed supplement for livestock in which the combined DAF and/or feed supplement with the dry medium material is extruded to "flash off" the excess moisture and render the processed supplement stable and generally acceptable for storage regarding odor, texture and shelf life.

Another object of the present invention is to provide an improved feed supplement for livestock in which the dry medium material would be of the nature of soy beans, soy, corn, ground hay, wheat, oats and other such dry medium materials.

Another object of the present invention is to provide an improved feed supplement for livestock in which the temperature of the mixture is raised above 250° Fahrenheit during the extrusion process or during the mixing process in order to properly sterilize the mixture thereby removing substantially all bacterial contaminates from the mixture.

Finally, an object of present invention is to provide an improved feed supplement for livestock which is generally safe for ruminants to ingest and is safe and economical to manufacture.

SUMMARY OF THE INVENTION

The present invention provides a feed supplement for livestock including, in a feed supplement combination, a quantity of waste product material selected from the group comprising dissolved air floatation product (DAF) and paunch manure and a quantity of dry medium selected from the group comprising soybeans, soy hulls, soybean protein derivatives, wheat, wheat middling, wheat straw, hay, alfalfa, sugar beet tailings, sugar beet pulp, sugar beets, corn, corn stalks, corn cobs, popcorn husks, sweet bran, silage, meat and bone meal, blood raw or meal form molasses, oats, oat straw, barley, barley straw, restaurant scraps, table scraps, sunflowers, sunflower seeds and hulls, milo, wild grass, suburban domestic grass clippings, cottonseed, cotton hulls, and cotton burs. The waste product material comprises between one percent (1%) and ninety-nine percent (99%) of the feed supplement combination. The feed supplement combination is then processed through an extrusion process involving the cooking, grinding and mixing of the feed supplement combination under pressure and elevated temperature, wherein the temperature of the feed supplement combination is raised above 250 degrees Fahrenheit to sterilize the feed supplement combination thereby eliminating substantially all bacterial contaminants from the feed supplement combination and substantially decreasing the moisture content of the feed supplement combination.

The present invention further contemplates a method of producing a feed supplement for livestock comprising the steps of providing a feed supplement combination including a quantity of waste product material selected from the group comprising dissolved air floatation product (DAF) and paunch manure and providing a quantity of a dry medium, with said waste product material comprising between one percent (1%) and ninety-nine percent (99%) of said feed supplement combination. The feed supplement combination is then processed through an extrusion process involving the cooking, grinding and mixing of the feed supplement combination under pressure and elevated temperature, and the temperature of the feed supplement combination is raised above 250 degrees Fahrenheit to sterilize said feed supplement combination thereby eliminating substantially all bacterial contaminants from said feed supplement combination. Finally, the moisture content of said feed supplement combination is decreased.

It is clear that the features of this invention combine to form a superior feed supplement for livestock. Because the invention utilizes previously unusable waste products to form the supplement, it is very beneficial to the environment and to reducing landfill deposits. Furthermore, the resulting feed supplement is high in "by-pass" proteins and other essential nutrients, and thus is an excellent addition to the feed of almost any ruminant. Finally, the present invention can combine the DAF or paunch manure with tens and even hundreds of different dry mediums yet still retain nutritional value. This means that the maker of the feed supplement may combine various ingredients to come up with the best combination for his or her livestock, yet retain the high nutritional value of the present invention. It is thus seen that the present invention provides a substantial improvement over the prior art.

DESCRIPTION OF THE PREFERRED EMBODIMENT

The present invention includes several embodiments of feed supplements which include dissolved air flotation product ("DAF") or paunch manure, and the variations are discussed herein. A first embodiment of the present invention contemplates a feed supplement formulation which includes a percentage of dissolved air floatation product ("DAF") which is mixed with a dry medium which is preferably a fibrous plant material or the like. As was discussed previously, DAF is a product recovered from waste water treatment plants, the DAF forming at the top of the settling tank in the sewer treatment system, and which is composed generally of oil and grease separated from the sewer effluent. The DAF is mechanically and/or chemically removed from the top surface of the sewer water being treated. The DAF then becomes a liability as there are currently few, if any, applications for DAF, and thus the DAF is merely applied to a landfill or the like to decompose therein. The present invention provides a use for the DAF which is both safe and efficient. Of course, it should be noted that many of the products removed from waste water could be used as the DAF of the present invention, and these include products removed by both chemical means and mechanical means such as screens, bars, rotary devices, stationary flow impediments, centrifuge devices, skimmers and settling tanks.

In the preferred embodiment, a percentage of DAF between twenty-five percent and seventy-five percent (25% and 75%) by weight or volume is added to dry medium to form the completed mixture and the two materials are mixed prior to extrusion. Of course, it may be possible or even preferable to increase or decrease the percentage of DAF outside of the ranges given, but it has been found through experimentation that the most beneficial feed supplement mixture is formed in those ranges.

The following list of dry medium materials has been found to be acceptable for use with the feed supplement of the present invention but it should be understood that the following list is in no way comprehensive or limiting in any manner. Acceptable dry medium materials would include the following: paunch manure, soybeans, soy hulls, soybean protein derivatives, wheat, wheat middling, wheat straw, hay, alfalfa, sugar beet tailings, sugar beet pulp, sugar beets, corn, corn stalks, corn cobs, popcorn husks, sweet bran, silage, meat and bone meal, blood raw or meal form molasses, oats, oat straw, barley, barley straw, restaurant scraps, table scraps, sunflowers, sunflower seeds and hulls, milo, wild grass, suburban domestic grass clippings, cottonseed, cotton hulls, and cotton burs. As stated above, the dry medium and the DAF are premixed and then fed into the extruder.

In the preferred embodiment, the extrusion process would involve the cooking of the mixture under pressure and elevated temperature, specifically feeding the mixture through a dry extruder which utilizes a screw type device to create friction, thereby cooking, grinding and mixing the mixture. It is necessary that the temperature of the mixture be raised above 250 degrees Fahrenheit in order to properly sterilize the mixture thereby removing all bacterial contaminants from the mixture. Furthermore, this high-temperature cooking "flashes off" the excessive moisture from the mixture thereby bringing the moisture range down into the neighborhood of 21%–29%. The resulting dry mixture which is released from the extruder can then be quickly and easily added to normal livestock feed as a high fat-high nutrition supplement for livestock feed. Of course, it should be noted that there are many different types of extrusion devices presently used which will properly prepare the feed supplement of the present invention, such as adjustable jaw expanders and wet extruders, the substitution of which would be understood by one skilled in the art of animal food preparation. Therefore it should be understood that such a substitution, particularly in the exchange of an extruder for an expander, is made part of this disclosure and is contemplated by the inventors.

A second embodiment of the present invention contemplates a feed supplement formulation which includes paunch manure. As was discussed previously, paunch manure is the partially digested feed residing in the first stomach of the ruminant after slaughter. During the slaughtering process, the stomach is removed and the contents are emptied. Currently there is no commercial use for the paunch manure, and it is this problem that the inventors are attempting to solve. Furthermore, the paunch manure must be disposed of in an environmentally safe and economically efficient manner, and such disposal means are not always readily available. There is therefore a need for a use to be found for the paunch manure produced during the slaughtering process.

In the preferred embodiment, a percentage of paunch manure between twenty-five percent and seventy-five percent (25% and 75%) by weight or volume is added to dry medium to form the completed mixture and the two materials are mixed prior to extrusion. Of course, the percentage of paunch manure may be decreased below the twenty-five percent (25%) level or increased above the seventy-five percent (75%) level, but it has been found that the unique and desirable features of the feed supplement of the present invention are enhanced by the inclusion of the paunch manure in the above-described percentages.

The following list of dry medium materials has been found to be acceptable for use with the feed supplement of the present invention but it should be understood that the following list is in no way comprehensive or limiting in any manner. Acceptable dry medium materials would include the following: dissolved air floatation product or "DAF", soybeans, soy hulls, soybean protein derivatives, wheat, wheat middling, wheat straw, hay, alfalfa, sugar beet tailings, sugar beet pulp, sugar beets, corn, corn stalks, corn cobs, popcorn husks, sweet bran, silage, meat and bone meal, blood raw or meal form molasses, oats, oat straw, barley, barley straw, restaurant scraps, table scraps, sunflowers, sunflower seeds and hulls, milo, wild grass, suburban domestic grass clippings, cottonseed, cotton hulls, and cotton burs. As stated above, the dry medium and the paunch manure are premixed and then fed into the extruder.

In the preferred embodiment, the extrusion process would involve the cooking of the mixture under pressure and elevated temperature, specifically feeding the mixture through a dry extruder which utilizes a screw type device to create friction, thereby cooking, grinding and mixing the mixture. It is necessary that the temperature of the mixture be raised above 250 degrees Fahrenheit in order to properly sterilize the mixture thereby removing all bacterial contaminants from the mixture. Furthermore, this high-temperature cooking "flashes off" the excessive moisture from the mixture thereby bringing the moisture range down into the neighborhood of 21%–29%, which in turn increases the "by-pass" protein value in the feed supplement. The resulting dry mixture which is released from the extruder can then be quickly and easily added to normal livestock feed as a high fat, high nutrition and high "by-pass" protein supplement for livestock feed.

In a third preferred embodiment, also including paunch manure, paunch manure is taken from the slaughtering location and directed into a pressing or squeezing device which will mechanically remove much of the moisture content from the paunch manure. There are several types of devices which function to mechanically remove moisture from the paunch manure, such as a screw or hydraulic press, centrifuge or other such dewatering device. The intent of passing the paunch manure through the mechanical press is to decrease the moisture content of the paunch manure from an upper range of sixty-five to eighty-five percent (65% to 85%) water to a moisture content preferably between forty to forty-five percent (40% to 45%). The moisture content of the paunch manure is preferably mechanically reduced prior to extrusion to permit the extruder to function correctly and reach the temperatures necessary to sterilize the paunch manure. Once the mechanical moisture removal is satisfactorily completed, the pressed paunch manure is fed into an extruder to continue the processing of the paunch manure.

As was discussed in connection with the second embodiment, the extrusion process would involve the cooking of the paunch manure under pressure and elevated temperature, specifically feeding the mixture through a dry extruder which utilizes a screw type device to create friction, thereby cooking, grinding and mixing the paunch manure. It is necessary that the temperature of the paunch manure be raised above 250 degrees Fahrenheit in order to properly sterilize the paunch manure thereby removing all bacterial contaminants from the paunch manure. Furthermore, this high-temperature cooking "flashes off" the excessive moisture from the paunch manure thereby bringing the moisture range down into the neighborhood of 21%–29%, which in turn increases the "by-pass" protein value in the feed supplement. The resulting dry processed paunch manure which is released from the extruder can then be quickly and easily added to normal livestock feed as a high fat, high nutrition and high "by-pass" protein supplement for livestock feed.

Once the paunch manure has been extruded, the resulting processed paunch manure may be used as a feed supplement without the addition of any other materials, or the processed paunch manure may be combined with a dry medium in a percentage between one percent and ninety-nine percent (1% and 99%) by weight or volume to form a completed feed supplement mixture. The following list of dry medium materials has been found to be acceptable for use with the feed supplement of the present invention but it should be understood that the following list is in no way comprehensive or limiting in any manner. Acceptable dry medium materials would include the following: dissolved air floatation product or "DAF", soybeans, soy hulls, soybean protein derivatives, wheat, wheat middling, wheat straw, hay, alfalfa, sugar beet tailings, sugar beet pulp, sugar beets, corn, corn stalks, corn cobs, popcorn husks, sweet bran, silage, meat and bone meal, blood raw or meal form molasses, oats, oat straw, barley, barley straw, restaurant scraps, table scraps, sunflowers, sunflower seeds and hulls, milo, wild grass, suburban domestic grass clippings, cottonseed, cotton hulls, and cotton burs.

As an example of the nutritional value of the various embodiments of the present invention, the following laboratory summary prepared by a certified laboratory is included:

LABORATORY REPORT SUMMARY

| Nutrient | 50% Paunch 50% Hay | 50% SoyH 50% DAF | 50% Paunch 50% Soy Hulls | 32% Paunch 19% DAF 50% SoyH |
|---|---|---|---|---|
| Moisture | 9.3 | 10.2 | 10.4 | 15.0 |
| C. Protein | 14.2 | 13.0 | 12.3 | 12.5 |
| C. Fat | 2.3 | 9.9 | 1.9 | 5.0 |
| Net Energy, G. | 38 | 53 | 36 | 43 |

| | Corn | Sw't Bran | Alf Hay | Soy Hulls | Corn Silage | Animal Fat |
|---|---|---|---|---|---|---|
| Moisture | 15 | 60 | 12 | 10 | 68 | 1 |
| C. Protein | 9 | 22 | 18 | 12 | 8 | 0 |
| C. Fat | 3.5 | — | 1.8 | 2.3 | 99 | 2.8 |
| Net Energy, G. | 67 | 67 | 25 | 52 | 46 | 196 |

Comparative Feed Value (dry matter basis)

50P/50H

| | | | | | | |
|---|---|---|---|---|---|---|
| Protein | 158 | 64 | 79 | 118 | 178 | — |
| Energy | 57 | 57 | 152 | 73 | 83 | 19 |

50SH/50DAF

| | | | | | | |
|---|---|---|---|---|---|---|
| Protein | 144 | 59 | 72 | 108 | 162 | — |
| Energy | 79 | 79 | 212 | 102 | 115 | 27 |

-continued

| 50P/50SH | | | | | | |
|---|---|---|---|---|---|---|
| Protein | 137 | 56 | 68 | 103 | 154 | — |
| Energy | 54 | 54 | 144 | 69 | 78 | 18 |
| 32P/18DAF/50SH | | | | | | |
| Protein | 133 | 57 | 69 | 104 | 156 | — |
| Energy | 64 | 64 | 172 | 83 | 93 | 22 |

(Numbers represent relative food value (percentage) when compared by specific nutrient (protein & energy) to each commodity)

The precise nature of the extrusion process is not critical to the present invention other than it being the most expedient process known to mix the feed supplement, grind it, cook it and dewater it. Several other processes can accomplish the same purpose, such as wet extruders or the like which not only perform the above functions but also expand the feed supplement thus increasing the volume of the feed supplement and making the feed supplement easier to ingest and digest, in addition to reducing the amount of feed supplement required for normal animal feeding.

Of course, it is to be understood that numerous modifications, additions, and substitutions may be made to the present invention which fall within the intended broad disclosure. For example, other types of dry mediums may be used other than those listed above should such dry mediums be found to be advantageous. Furthermore, the precise nature of the pressing and extruding processes may be varied so long as the moisture content of the paunch manure is mechanically lowered during the pressing process and the minimum temperature of the extrusion process remains above 250 degrees Fahrenheit in order to insure proper sterilization of the paunch manure. Also, the precise nature of the paunch manure product or DAF product may vary depending on the type of ruminant being processed, but the preferred ratio of paunch manure and/or DAF to dry medium will be determined through various testing procedures, the nature of which would be understood by one skilled in the art of livestock feeds. Finally, the exact moisture percentages and precise processing of the product may be varied so long as the resulting processed paunch manure is sterilized and safe and effective in use.

There has therefore been shown and described a feed supplement for livestock which accomplishes at least all of its intended objectives.

We claim:

1. A feed supplement for livestock comprising;
in a feed supplement combination;
a quantity of waste product material selected from the group comprising dissolved air floatation product (DAF) and paunch manure; and
a quantity of generally inert dry medium which is free of chemical reactions with said quantity of waste product material, said dry medium selected from the group comprising soybeans, soy hulls, soybean protein derivatives, wheat, wheat middling, wheat straw, hay, alfalfa, sugar beet tailings, sugar beet pulp, sugar beets, corn, corn stalks, corn cobs, popcorn husks, sweet bran, silage, meat and bone meal, raw blood, blood meal, molasses, oats, oat straw, barley, barley straw, restaurant scraps, table scraps, sunflowers, sunflower seeds and hulls, milo, wild grass, suburban domestic grass clippings, cottonseed, cotton hulls, and cotton burs;
said quantity of waste product material and said quantity of generally inert dry medium being combined with each other to form said feed supplement combination, said waste product material and said generally inert dry medium being mixed to form a completed mixture prior to extrusion remain.
said waste product material comprising between one percent (1%) and ninety-nine percent (99%) by weight of said feed supplement combination;
said feed supplement combination being processed through an extrusion process involving the cooking, grinding and mixing of said feed supplement combination under pressure and elevated temperature, the temperature of said feed supplement combination being raised above 250 degrees Fahrenheit.

2. The feed supplement for livestock of claim 1 wherein said waste product material comprises between twenty-five percent (25%) and seventy-five percent (75%) by weight of said feed supplement combination.

3. The feed supplement for livestock of claim 1 wherein said feed supplement combination includes both said DAF and said paunch manure in percentages by weight of between one percent (1%) and ninety-nine percent (99%).

4. The feed supplement for livestock of claim 1 wherein the moisture content of said paunch manure is reduced prior to extrusion.

5. The feed supplement for livestock of claim 1 wherein said extrusion process comprises a dry extrusion process including a screw type device to create friction, thereby cooking, grinding and mixing the mixture, said temperature of said feed supplement combination being raised above 250 degrees Fahrenheit to sterilize the combination thereby eliminating substantially all bacterial contaminants therefrom and substantially decreasing the moisture content of said feed supplement combination.

6. A feed supplement for livestock comprising;
in a feed supplement combination;
a quantity of paunch manure; and
a quantity of dry medium selected from the group comprising soybeans, soy hulls, soybean protein derivatives, wheat, wheat middling, wheat straw, hay, alfalfa, sugar beet tailings, sugar beet pulp, sugar beets, corn, corn stalks, corn cobs, popcorn husks, sweet bran, silage, meat and bone meal, raw blood, blood meal, molasses, oats, oat straw, barley, barley straw, restaurant scraps, table scraps, sunflowers, sunflower seeds and hulls, milo, wild grass, suburban domestic grass clippings, cottonseed, cotton hulls, and cotton burs;
said quantity of paunch manure and said quantity of generally inert dry medium being combined with each other to form said feed supplement combination, said paunch manure and said generally inert dry medium being mixed to form a completed mixture prior to extrusion.
said paunch manure comprising between one percent (1%) and ninety-nine percent (99%) by weight of said feed supplement combination;
said feed supplement combination being processed through an extrusion process involving the cooking, grinding and mixing of said feed supplement combination under pressure and elevated temperature, the temperature of said feed supplement combination being raised above 250 degrees Fahrenheit.

* * * * *